83-869 EX
XR RE 6,682
[illegible]NCE from
OOD-SAWING,
Circular Saw Machines.
Angular.
149,327
EXAMINER.
G. MORGAN & J. R. FOSTER.
Machine for Making Wedges.
Re.
No. 6,682.
Reissued Oct. 5, 1875.
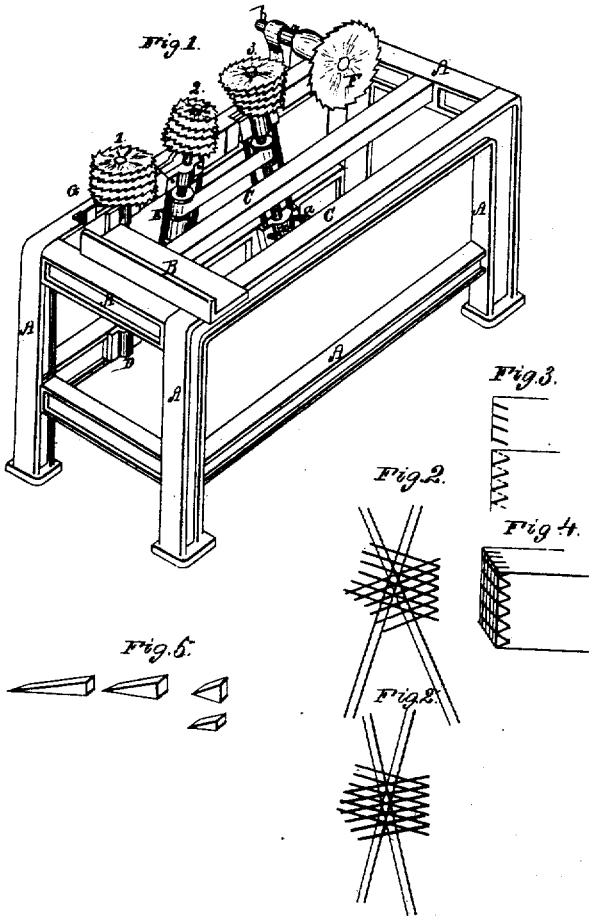
Witnesses.
S. N. Piper
S. N. Böllard
Gerry Morgan.
Jacob R Foster
by their attorney
R K Eddy
N. PETERS, PHOTO-LITHOGRAPHER, WASHINGTON, D. C.

UNITED STATES PATENT OFFICE.

GERRY MORGAN AND JACOB R. FOSTER, OF ANDOVER, NEW HAMPSHIRE; SAID FOSTER ASSIGNOR TO SAID MORGAN.

IMPROVEMENT IN MACHINES FOR MAKING WEDGES.

Specification forming part of Letters Patent No. 149,327, dated April 7, 1874; reissue No. 6,682, dated October 5, 1875; application filed March 15, 1875.

*To all whom it may concern:*

Be it known that we, GERRY MORGAN and JACOB R. FOSTER, both of Andover, in the county of Merrimack and State of New Hampshire, have invented an Improvement in Machines for Making Wedges, of which the following is a specification:

Our invention relates to machines for making wedges, such as are used extensively in the manufacture of doors, sashes, and woodwork generally, where mortise-and-tenon joints are made and used; and it consists in a novel construction, combination, and arrangement of parts, which have for their object an effectual and rapid machine for making wedges, as will be fully set forth hereafter.

Figure 1 is a perspective view of our improved machine. Fig. 2 is a vertical elevation of the two inclined sets of saws for cutting the inclines of the wedges. Figs. 3 and 4 represent pieces of wood after having been acted on by the saws, showing the wedge in different stages of manufacture. Fig. 5 represents perfected wedges.

A A denote the frame-work of the machine, which is bolted together in the usual way; B, a carriage, arranged to reciprocate on ways C, and to carry the material to be acted upon by the saws. Arranged in suitable bearings applied to the frame-work is a vertical arbor, D, carrying any desired number of slitting-saws 1, the operation of which is the initial step in forming the wedges. These saws may be adjusted, by washers or collars between them, the desired distance for the widths of the wedges. Directly in line with and beyond these slitting-saws is another series of saws, 2, situated upon an inclined arbor, E. Each of these latter saws cuts one incline of each wedge. Directly in line with and beyond this second series of saws is another series, 3, upon another inclined arbor, which may be adjusted to any required angle by the screws *a a*. This latter series of saws is inclined in the opposite direction to series No. 2, and each saw of it cuts the other side or face of a wedge.

It is evident that if the saws comprising either of the series (2 and 3) were all of the same diameter, and consequently formed a cylinder of saws, when they were inclined the uppermost saw of set No. 2 would cut deepest into the log, while the lowest one would make the least cut; but this is obviated, and saws made to cut to the same depth into the stuff, by making the series in the shape of a frustum of a cone, so that when it is inclined the points on the saws at which they make the cuts are in a vertical line. With this arrangement, in series 2 the top saw is the smallest, while the bottom one is the largest. In series 3, which is inclined the other way, the reverse of this is the case. F is a cutting-off saw, situated in front of and beyond the last set of wedge-saws No. 3, and is adjustable in the line of the axis of its arbor *b*, for the varying lengths of wedges. Upon the frame-piece A are placed one or more adjustable gages, G, to control and guide the end or edge of the material for the proper depth of cut.

It will be obvious that one set of wedge-saws can be used to cut both inclines of the wedge by retracting the carriage, turning the stick from which the wedges are being cut half around, and passing it again through the saws, and then to the cutting-off saw F.

A machine constructed in accordance with the foregoing description is simple in construction, effectual and rapid in operation, and not liable to be easily disarranged.

We are aware that series of saws have been arranged in line for successive operations on wood, and we disclaim such a device *per se*. We are aware of the Letters Patent No. 119,306, and disclaim the same.

We claim—

1. In combination with a supporting-frame, A, and reciprocating carriage B, the series 1 of saws, the frustum-shaped inclined series 2 of saws, and the cutting-off saw F, constructed and acting in co-operative relation with each other, substantially as described.

2. The combination of the series of saws 1, frustum-shaped inclined series of saws 2, frustum-shaped inclined series of saws 3, and cutting-off saw F, constructed and operating together substantially as described.

3. The combination of the two frustum-shaped series 2 3 of saws and the cutting-off saw F, all arranged substantially in manner and to operate as described.

GERRY MORGAN.
JACOB R. FOSTER.

Witnesses:
FRANK W. PROCTOR,
AMOS H. PROCTOR.